April 27, 1954  A. H. HAUSMAN  2,677,015
FREQUENCY SHIFT MEASURING CIRCUIT
Filed June 3, 1952
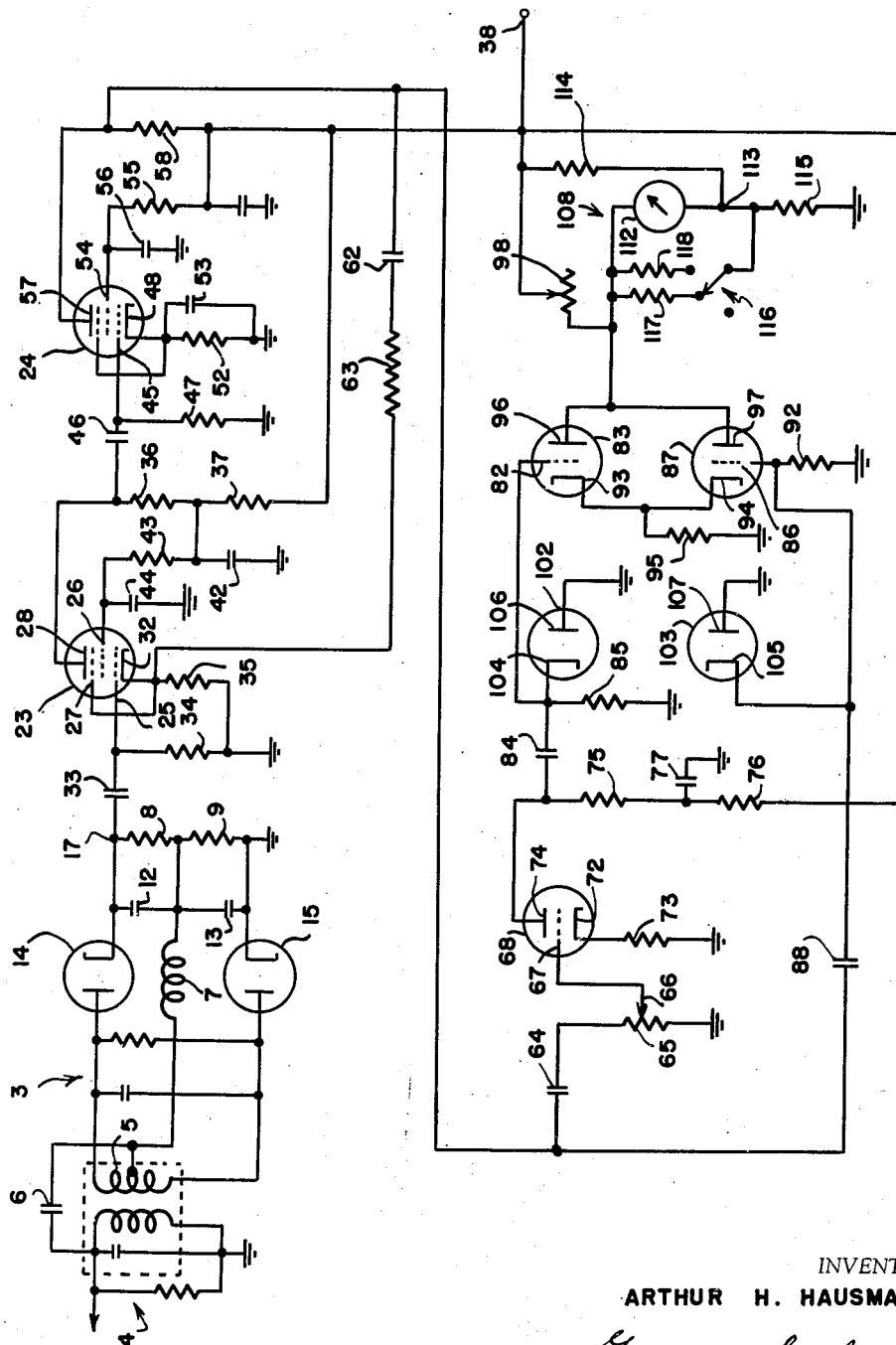
INVENTOR
ARTHUR H. HAUSMAN
BY
ATTORNEY Patented Apr. 27, 1954

2,677,015

UNITED STATES PATENT OFFICE 2,677,015

FREQUENCY SHIFT MEASURING CIRCUIT

Arthur H. Hausman, Alexandria, Va., assignor, by mesne assignments, to the United States of America as represented by the Secretary of the Navy Application June 3, 1952, Serial No. 291,540

6 Claims. (Cl. 178—69)

The present invention relates to a frequency shift measuring circuit, and more particularly to a circuit to measure frequency shift between the two signals used in frequency shift telegraphy keying. In such automatic telegraphy systems, intelligence is conventionally transmitted by one or the other of two carrier waves separated in frequency from each other by a few hundred cycles, one carrier wave representing a mark, the other a space. Such an arrangement may be thought of as transmission of a carrier signal at one frequency which shifts periodically to another frequency. Since the frequency of the carrier signal shifts from one frequency to another, the usual metering circuits are not suitable for the use required of this invention. Since transmission may rest upon either the mark or space frequency for an indefinite or irregular period of time, it is necessary that frequency shift or frequency tuning indicators respond equally well when either frequency signal is received. This invention provides a frequency shift measuring circuit that is responsive to changes in frequency regardless of the amount of frequency shift or out of resonance conditions.

Frequency shift measuring circuits in the past have suffered from various disadvantages. Various audio frequency meters have included an adjustable frequency oscillator producing a signal frequency approximately equal to the carrier frequency so as to make possible production of an audible heterodyne or "beat" note. However such test instruments have depended upon the musical ability of the operator, and the results were therefore unreliable. Other devices employing resonant circuits have also been used but they have not possessed sufficient stability to provide accurate indications over an extended period of time. Furthermore, the use of visual indicating instruments have been generally unsatisfactory because the indicator fluctuates rapidly over a wide range.

The present invention overcomes these disadvantages in that a very stable and accurate circuit is provided for visually indicating frequency shift in transmission systems employing frequency shift keying. The circuit provided herein includes a discriminator producing an output voltage proportional to frequency deviation between a carrier and the resonant frequency of a discriminator circuit. Two amplifier stages in cascade follow the discriminator. Degenerative feedback is provided from the second stage to the first stage so that the amplified stages will be stabilized. The degenerative feedback also produces a linear response over wide frequency shifts.

An output is taken from the second stage amplifier and is fed to a push-pull amplifier so that there is provided a steady state voltage proportional to the frequency shift. A suitable meter is utilized so that the value of this voltage may be noted visually.

It should be observed that although this circuit has particular application to frequency shift telegraphy keying, it may also be utilized wherever a visual indication of frequency difference between two signals is desired.

Accordingly, it is an object of the present invention to provide an improved metering circuit to indicate frequency deviation between two signals in a frequency shift telegraphy system.

Another object is to provide a measuring circuit of high stability to indicate frequency difference between any two signals.

Another object is to provide a measuring circuit for use in a frequency shift telegraphy system wherein feedback from a second amplifier stage to a first amplifier stage is utilized to insure stability of operation.

Another object of the invention is to provide a frequency shift metering apparatus which includes stable rectifier and amplifier means so that a non-fluctuating meter reading may be obtained.

Other objects and many of the attendant advantages of this invention will be readily appreciated as the same becomes better understood by reference to the following detailed description when considered in connection with the accompanying drawing, the single figure of which is a circuit diagram of a preferred embodiment of the invention.

Referring now to the drawing, there is shown a discriminator circuit 3 comprising a discriminator transformer having a tuned primary 4, a tuned center-tapped secondary 5, and a coupling condenser 6 connected between the anode end of the primary and the center-tap on the secondary. A circuit extends from the center-tap of the secondary through the radio-frequency choke coil 7 to the junction of the resistances 8 and 9 respectively paralleled by condensers 12 and 13. The diodes 14 and 15 are respectively connected between the resistances 8 and 9 and respective ends of the tuned secondary 5, so that each of the diodes is energized by the vector sum of the voltage injected by the condenser 6 and one-half the voltage on the secondary 5. When the carrier frequency impressed on the discriminator transformer is the same as the resonant frequency of the tuned primary 4 and the tuned secondary 5, the vector sums of the voltages are equal, so that equal and opposite voltages appear across the resistances 8 and 9. The potential at point 17 is therefore equal to ground potential. However, a deviation in the frequency impressed on the discriminator transformer will unbalance the voltages impressed on the diodes 14 and 15 and produce a voltage at point 17 above or below ground which varies in magnitude and polarity with the magnitude and sense of the frequency deviation.

The voltage at point 17 is impressed on the pre-amplifier comprising pentode tubes 23 and 24. The amplifier is provided with degenerative feedback to prevent instability and to provide linear response. The pentode tube 23 comprises a control grid 25, screen grid 26, suppressor grid 27, anode 28, and cathode 32, the control grid 25 being connected through the coupling condenser 33 to the point 17 and through the grid resistance 34 to ground. The cathode 32 is connected through the resistance 35 to ground, and the anode 28 is connected through the anode resistance 36 and decoupling resistance 37 to positive terminal 38, the decoupling condenser 42 preventing rapid voltage fluctuations and subsequent interaction between stages. The screen grid 26 is connected to the junction of condenser 42 and resistance 37 through the screen resistance 43, the decoupling condenser 44 preventing fluctuations in screen grid voltage.

The voltage variations of the anode 28 are impressed on the control grid 45 of pentode tube 24 through the coupling condenser 46, the grid resistance 47 providing a leakage path therefor. The cathode 48 is connected to ground through resistance 52 bypassed by condenser 53. The screen grid 54 is connected to positive terminal 38 through the screen resistance 55, the screen bypass condenser 56 being provided to prevent voltage fluctuations. The anode 57 is connected to the positive terminal 38 through the anode resistance 58.

Voltage fluctuations of the anode 57 of tube 24 are impressed on the cathode 32 of tube 23 through condenser 62 and resistance 63. The circuit provides substantial degeneration so as to prevent any tendency to oscillate or instability in the absence of a signal.

The anode 57 is also coupled to tubes 83 and 87 through a phase splitter which serves to provide two output voltages of substantially equal magnitude and of opposite polarity. While the phase splitter may be of any desired type, it is described herein as a coupling of the signal at the anode of tube 24 to the grid of tube 87 and a coupling of a corresponding inverted signal to the grid of tube 83. The inverted signal is provided by the phase inverter tube 68, which receives the voltage fluctuations of the anode 57 through coupling condenser 64 and the potentiometer 65, the movable tap 66 thereon being connected to the grid 67 of tube 68. The tube 68 is used as a phase inverter rather than as an amplifier, and its cathode 72 is connected to ground through resistance 73 which provides degeneration to reduce the gain. The anode 74 is connected through the anode resistance 75 and the de-coupling resistance 76 to positive terminal 38, the decoupling condenser 77 preventing interaction between amplifier stages.

An output voltage from anode 74 is impressed on the grid 82 of tube 83 through coupling condenser 84 and grid resistance 85, while the voltage fluctuations of anode 57 of tube 24 are impressed on the grid 86 through coupling condenser 88 and grid resistance 92, the fluctuations of the respective anodes being 180° out of phase with each other. The potentiometer 65 is adjusted to equalize the magnitude of the fluctuations, so that the grids 82 and 86 of tubes 83 and 87 receive equal signals out of phase with each other.

The tubes 83 and 87 have their cathodes 93 and 94 connected together and grounded through resistance 95, while the anodes 96 and 97 are also connected together and to positive terminal 38 through the variable resistance 98. Since tubes 83 and 87 are operated in Class A on the linear portions of their operating characteristics, the anode current of the two tubes would be constant if equal voltages of opposite phase were impressed on the respective grids thereof, so that the voltage at the anodes would also be constant. In the present application, it is desired that the anode voltage decrease as the magnitude of the impressed signal increases to provide an indication of the magnitude of the impressed signal.

The diode limiters 102 and 103 have their respective cathodes 104 and 105 connected to the grids 82 and 86 respectively and their anodes 106 and 107 connected to ground so as to prevent negative excursions of the respective grids. The grid excursions of tubes 83 and 87 are therefore limited to positive excursions which reduce the voltage on anodes 96 and 97 by increasing the voltage drop across the variable resistance 98, the respective tubes conducting increased current on alternate half cycles.

The metering circuit 108 comprises a milliammeter 112 connected between the anodes 96 and 97 and the junction 113 of the resistances 114 and 115, the resistances 114 and 115 being connected between positive terminal 38 and ground and proportioned to produce a voltage at junction 113 approximately equal to the normal voltage at the anodes 96 and 97. The variable resistance 98 is adjusted to cause the milliammeter 108 to indicate zero current under conditions of no signal.

It will be apparent that the frequency of the voltage fluctuations impressed on the milliammeter 112 will be at twice the frequency of the impressed keying, since tubes 83 and 87 are conducting on alternate half-cycles. For this reason, the natural damping of the milliammeter is sufficient to provide a substantially steady indication.

The operation of the present invention is as follows: The discriminator circuit is adjusted so that both carrier frequencies lie within its linear range of operation and once so adjusted, may be left for extended periods of time. The output voltage of the discriminator will vary in magnitude with the difference in frequency between the two carriers, in polarity with the sense of the frequency deviation; and in frequency with the speed of keying. The coupling condensers and resistors are made large to extend the low-frequency response of the amplifier to less than one cycle per second, and since the normal keying speed of an automatic telegraph system is several cycles per second, the frequency may be ignored. However, the coupling condensers acquire charges which automatically adjust themselves to slow changes in the impressed carrier frequencies, so that extreme accuracy in the adjustment of the discriminator is not required. The sense or polarity of the voltage appearing at point 17, is also of no importance, since voltage fluctuations are an alternating current voltage and one of the tubes 83 and 87 conducts an increased current on each half-cycle of an alternating current voltage. The indication on milliammeter 112 therefore represents only the frequency deviations.

The magnitude of the voltages impressed on the grids 82 and 86 of tubes 83 and 87 are made equal by adjustment of potentiometer 65, and the "zero" of milliammeter 112 is set by variable resistance 98. The sensitivity of milliammeter 112 is changed by shunting the meter by means of switch 116 and shunt resistances 117 and 118.

It is apparent that the invention provides a new and improved circuit for measuring frequency shift. The circuit is one which is more stable than any previously known to the art, and it also provides a visual indication that is much less subject to fluctuation than has been common before. The invention is capable of application to frequency shift telegraphy systems, as well as to any system wherein it is desired to provide a visual indication of frequency difference between two signals.

It should be understood, of course, that the foregoing disclosure relates to only a preferred embodiment of the invention and that numerous modifications or alterations may be made therein without departing from the spirit and scope of the invention as set forth in the appended claims.

What is claimed and desired to be protected by Letters Patent of the United States is:

1. A frequency shift measuring circuit comprising, a discriminator adapted to produce an output voltage proportional to shift of frequency between two input signals, first amplifier means to which the output of the discriminator is fed, phase splitter means associated with said first amplifier means, second amplifier means including two diodes, a connection between said phase splitter means and said second amplifier means whereby input to one diode is out of phase with input to the other of said diodes, said second amplifier means also including amplifier tubes having their cathodes connected together and their anodes connected together, connections between said diodes and the grids of said amplifier tubes, and a circuit including a meter connected between said anodes and ground, whereby a meter reading proportional to said shift of frequency may be taken.

2. A measuring circuit comprising a discriminator adapted to produce an output voltage proportional to shift of frequency of an input signal from a center frequency, at least two amplifier stages following said discriminator, said amplifier stages adapted to amplify the discriminator output to a desired level, feedback means from the second to the first of said amplifier stages whereby stability of the circuit is maintained, phase splitter means to which the output from said amplifier stages is fed, an amplifier unit including a pair of diodes, each diode having its cathode connected to said phase splitter means, a pair of amplifier tubes, each amplifier tube having a grid connected to the cathode of one of said diodes respectively, and a meter to which the output from said amplifier tubes is fed.

3. A measuring circuit comprising a discriminator adapted to produce an output voltage proportional to shift of frequency of an input signal from a center frequency, at least two amplifier stages following said discriminator, said amplifier stages adapted to amplify the discriminator output to a desired level, feedback means from the second to the first of said amplifier stages whereby stability of the circuit is maintained, phase splitter means to which the output from said amplifier stages is fed, said phase splitter means including a first and second input lead and a triode inverter, said first input lead connected to the grid of said triode, said second lead connected to a condenser, the output from said triode being 180 degrees out of phase with the output voltage passed at the said condenser amplifier means having two input circuits connected to the output of said triode and said condenser respectively, and a meter connected to said amplifier responsive to conduction of said amplifier to indicate the shift in the frequency impressed on said discriminator.

4. In a frequency shift measuring circuit the combination of discriminator means for producing a voltage proportional to frequency shift of a signal from a center frequency, phase splitting means connected to said discriminator means, amplifier means connected to said phase splitting means and including a pair of diodes having grounded anodes, a pair of amplifier tubes, a connection from the cathodes of each of said diodes to the control grids of each of said amplifier tubes, the anodes of said amplifier tubes being connected together, and a meter connected between said amplifier anodes and ground.

5. In a frequency shift measuring circuit, the combination of a discriminator to produce a voltage proportional to shift of a signal from a center frequency, at least two amplifier stages arranged in cascade, negative feedback means from the second of said stages to the first of said stages, phase splitter means including a phase inverter, means to feed output from said second stage to said phase splitter, amplifier means tied to said phase splitter and a metering unit connected to indicate the anode current conduction of said amplifier means.

6. In a measuring circuit for alternating current voltage, a phase splitter connected to said alternating current voltage to provide two signals of equal and opposite magnitude, an amplifier comprising first and second tubes each having at least an anode, a cathode and a control grid, an individualized rectifier for each said tube having its anode grounded and its cathode connected to the control grid thereof to bypass negative signals to ground, means coupling said two signals from said phase splitter to respective control grids of said first and second tubes, resistance means connecting the anodes of said first and second tubes to a source of anode power, and meter means connected to said anodes to indicate the conduction of said first and second tubes, whereby to indicate the magnitude of said alternating current voltage.

References Cited in the file of this patent

UNITED STATES PATENTS

| Number | Name | Date |
|---|---|---|
| 2,217,267 | Eisele | Oct. 8, 1940 |
| 2,226,459 | Bingley | Dec. 24, 1940 |
| 2,250,598 | Neeteson | July 29, 1941 |
| 2,264,715 | Rohr et al. | Dec. 2, 1941 |
| 2,270,295 | Harley | Jan. 20, 1942 |
| 2,510,531 | Trevor et al. | June 6, 1950 |